US008429904B2

(12) United States Patent
Shibamori et al.

(10) Patent No.: US 8,429,904 B2
(45) Date of Patent: Apr. 30, 2013

(54) WORKING MACHINE

(75) Inventors: Kazuhiro Shibamori, Joso (JP);
Kazunori Nakamura, Tsuchiura (JP);
Kouji Ishikawa, Kasumigaura (JP);
Yoichi Kowatari, Kasumigaura (JP);
Hidenobu Tsukada, Ushiku (JP);
Shohei Kamiya, Kasumigaura (JP);
Masanori Ezawa, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 149 days.

(21) Appl. No.: 12/818,433

(22) Filed: Jun. 18, 2010

(65) Prior Publication Data
US 2010/0326058 A1    Dec. 30, 2010

(30) Foreign Application Priority Data

Jun. 25, 2009    (JP) ................................. 2009-151092

(51) Int. Cl.
*F01N 3/00* (2006.01)
*F01N 3/02* (2006.01)

(52) U.S. Cl.
USPC .................................. 60/295; 60/297; 60/311

(58) Field of Classification Search .................. 60/297, 60/311, 286, 295
See application file for complete search history.

(56) References Cited

U.S. PATENT DOCUMENTS

| 6,497,095 | B2 * | 12/2002 | Carberry et al. | 60/295 |
|---|---|---|---|---|
| 7,104,050 | B2 * | 9/2006 | Sato et al. | 60/295 |
| 7,707,999 | B2 * | 5/2010 | Inoue | 123/672 |
| 7,716,920 | B2 * | 5/2010 | Onodera et al. | 60/295 |
| 7,730,720 | B2 * | 6/2010 | Kogo | 60/286 |
| 2007/0056270 | A1 * | 3/2007 | Liimatta et al. | 60/295 |
| 2007/0251214 | A1 * | 11/2007 | Nishino et al. | 60/277 |
| 2008/0178576 | A1 | 7/2008 | Meier et al. | |

FOREIGN PATENT DOCUMENTS

| EP | 1 722 087 A2 | 11/2006 |
|---|---|---|
| EP | 1 965 061 A2 | 9/2008 |
| FR | 2 921 413 A1 | 3/2009 |
| JP | 2003-159914 A | 5/2003 |
| JP | 2003-314250 A | 11/2003 |
| JP | 2005-155444 A | 6/2005 |

\* cited by examiner

*Primary Examiner* — Thomas Denion
*Assistant Examiner* — Dapinder Singh
(74) *Attorney, Agent, or Firm* — Mattingly & Malur, PC (57) ABSTRACT

Disclosed is a working machine capable of preventing damage to a filter due to excessive accumulation of particulate matter (PM), even under a situation that requires, prior to compulsory regeneration of the filter, moving the machine to a place in which to perform the regeneration work. The working machine that includes an exhaust treatment device 4 having a filter 6 to trap the PM, a regeneration control section 31 for compulsorily regenerating the filter, and a regeneration instruction device 23 for instructing the regeneration control section 31 to start the compulsory regeneration. Further, when a deposition quantity estimating element determines that an actual PM deposition quantity has reached a deposition alarm level, an alarm device 12 notifies an operator that the time has come to start the movement of the working machine to the place of regeneration.

7 Claims, 8 Drawing Sheets

| REFERENCE OUTSIDE AIR TEMPERATURE (°C) | CORRECTION COEFFICIENT $\beta$ |
|---|---|
| ~-10 | 2.0 |
| -9~0 | 1.9 |
| 1~10 | 1.5 |
| 11~20 | 1.0 |
| 21~25 | 0.9 |
| 26~30 | 0.8 |
| 31~35 | 0.7 |
| 36~40 | 0.6 |
| 41~ | 0.5 |

FIG.8

| REFERENCE EXHAUST TEMPERATURE (°C) | CORRECTION COEFFICIENT $\beta$ |
|---|---|
| ~49 | 2.0 |
| 50~99 | 1.9 |
| 100~149 | 1.7 |
| 150~199 | 1.5 |
| 200~249 | 1.3 |
| 250~299 | 1.1 |
| 300~349 | 1.0 |
| 350~399 | 0.9 |
| 400~ | 0.8 |

FIG.9

| REFERENCE ENGINE SPEED (rpm) | CORRECTION COEFFICIENT $\beta$ |
|---|---|
| ~999 | 1.0 |
| 1000~1499 | 1.0 |
| 1500~1999 | 1.0 |
| 2000~2499 | 1.2 |
| 2500~ | 1.4 |

WORKING MACHINE

BACKGROUND OF THE INVENTION

1. Field of the Invention

The present invention relates generally to working machines having a diesel engine. The invention relates more particularly to a working machine used in an environment that requires moving the machine to a place in which to perform regeneration work when an internal filter is subjected to compulsory regeneration.

2. Description of the Related Art

An exhaust treatment device removes particulate matter (hereinafter, referred to as PM) from the exhaust gases of a diesel engine. In some cases, such an exhaust treatment device includes a diesel particulate filter (DPF, which may hereinafter be referred to simply as the filter). In this type of exhaust treatment device, the filter needs to be regenerated by removing accumulated PM timely to avoid an increase in exhaust pressure due to continued PM accumulation.

Methods of filter regeneration includes compulsory regeneration by which the unburnt fuel contained in the exhaust is to be combusted to compulsorily increase the exhaust temperature to a temperature level at which the PM combusts (hereinafter, this combustion temperature may be referred to as the regenerative temperature). Two methods are useable to execute compulsory regeneration: One is an automatic regeneration method, in which the filter will be regenerated automatically if the estimated quantity of PM accumulation exceeds a predetermined threshold level or any other predetermined condition is met. The other is a manual regeneration method, in which the filter is regenerated in given timing by manual operations of an operator. JP-2003-155914-A, for example, discloses the latter method. In addition, the latter method, for example, discloses a manual regenerating technique in which, when the quantity of PM accumulation in a filter exceeds a threshold level at which the filter requires regeneration, a lamp will be blinked to notify to an operator that the time has come for the filter to require manual regeneration.

SUMMARY OF THE INVENTION

The hydraulic excavators (construction machines) and other working machines driven by a diesel engine may need to work in potentially flammable surroundings. For example, loading/unloading a vessel that carries wooden chips requires diesel-engined hydraulic excavators. During compulsory regeneration of a filter, exhaust gases are maintained at a high temperature over a required time (say, several minutes), as discussed above. To compulsorily regenerate the filter by manual means in the above-discussed environment, therefore, there is a need to ensure working safety by moving the working machine to a place around which potentially flammables are absent (hereinafter, this place may be referred to as the place of regeneration).

Even during the movement of the working machine to the place of regeneration, however, PM accumulation in the filter will continue. Additionally, as in JP-2005-155444-A, the relevant lamp may blink before the movement of the working machine is started. For these reasons, the accumulation of PM during the movement could result in a permissible accumulation level being exceeded. Combusting PM in excess of the permissible accumulation level is likely to cause melting damage or thermal damage to the filter.

An object of the present invention is to provide an working machine capable of preventing damage to a filter due to excessive accumulation of PM, even under a situation that requires, prior to compulsory regeneration of the filter, moving the machine to a place in which to perform regeneration work.

In order to attain the above object, an working machine of the present invention comprises: a diesel engine; an exhaust treatment device having a filter to trap PM contained in exhaust gases of the engine; regeneration control means that compulsorily elevates an exhaust temperature by allowing a certain quantity of fuel to stay in the exhaust gases of the engine to compulsorily regenerate the filter; regeneration instruction means that instructs the regeneration control means to start the compulsory regeneration; means for estimating an actual quantity of PM deposition in the filter; means in which is stored a reference quantity of deposition that indicates regeneration timing of the filter in terms of the quantity of PM deposited in the filter; means for estimating a movement-associated quantity of PM likely to be deposited during movement of the working machine to a place where is suitable for the compulsory regeneration of the filter, in the basis of a predicted value of either a time required for movement of the working machine to the place of regeneration, or a distance to the place of regeneration; means for determining whether the actual quantity of PM deposition, estimated by the actual-deposition quantity estimating means, has reached a deposition alarm level derived by subtracting the movement-associated PM deposition quantity from the reference quantity of deposition; and an alarm device for notifying an operator of a time to start the movement of the working machine to the place of regeneration when the deposition quantity estimating means determines that the actual quantity of PM deposition has reached the deposition alarm level.

According to the present invention, excessive deposition of PM that may damage a filter in a working machine is prevented, even under a situation that requires, prior to compulsory regeneration of the filter, moving the machine to a place in which to perform regeneration work.

DESCRIPTION OF THE PREFERRED EMBODIMENTS

Hereunder, embodiments of the present invention will be described with reference to the accompanying drawings.

Figure 1:
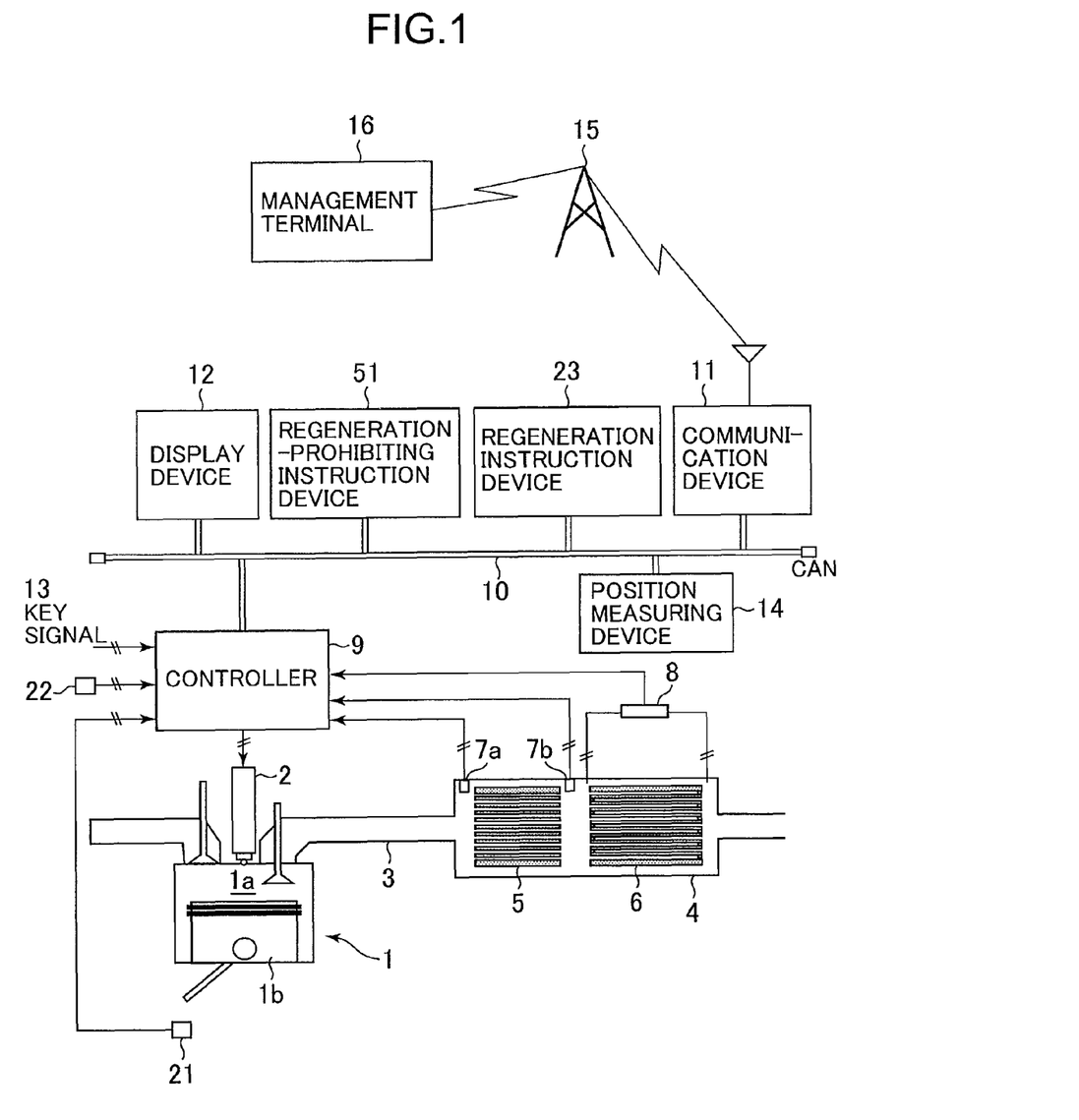
FIG. 1 is a schematic configuration diagram of an working machine according to a first embodiment of the present invention.

FIG. 1 is a schematic configuration diagram of a working machine according to a first embodiment of the present invention. The working machine shown in the figure includes a diesel engine 1, an exhaust treatment device 4, a regeneration instruction device 23, a controller (control device) 9, and an alarm device 12.

The diesel engine (hereinafter referred to simply as the engine) 1 elevates internal air of a combustion chamber (cylinder) 1a to a high temperature by compressing the air with a piston 1b, then causes spontaneous ignition of a fuel supplied to the compressed air via a fuel injector 2, and thus obtains motive power. Exhaust gases from the combustion chamber 1a are introduced into the exhaust treatment device 4 via an exhaust pipe 3 connected to the combustion chamber 1a.

The exhaust treatment device 4 includes an oxidation catalyst 5 and a catalyst-containing diesel particulate filter (DPF) 6, and uses the DPF 6 to trap particulate matter (PM) contained in the exhaust gases of the engine 1 and purify the exhaust.

The oxidation catalyst 5, intended to elevate an exhaust temperature during compulsory regeneration of the filter 6 by reacting with an unburnt fuel contained in the exhaust gases, is disposed at an upstream side of the filter 6, in a flow-through direction of the exhaust. Sensors 7a and 7b (exhaust temperature sensor) each for detecting the exhaust temperature are mounted at an entrance side and exit side of the exhaust in the oxidation catalyst 5. The temperature sensor 7a at the entrance side of the oxidation catalyst 5 detects a temperature of the exhaust flowing into the catalyst 5, and the temperature sensor 7b at the exit side of the catalyst 5 detects a temperature of the exhaust flowing into the filter 6. Upon detecting the exhaust temperatures, the exhaust temperature sensors 7a and 7b output respective detection signals to the controller 9.

The filter 6 is a diesel particulate removal filter for trapping the PM contained in the exhaust, and is disposed at a downstream side of the oxidation catalyst 5, in the flow-through direction of the exhaust. The PM that has been trapped in the filter 6 can be combusted away by passing therethrough the exhaust maintained at a regenerative temperature or more. In addition, a differential pressure sensor 8 (differential pressure sensor) that detects a differential pressure between an inlet and outlet of the filter 6 is mounted across it. The differential pressure, after being detected by the differential pressure sensor 8, is output to the controller 9 and used for purposes such as estimating an actual quantity of PM deposition in the filter 6.

The regeneration instruction device (regeneration instruction means) 23 is used for an operator to instruct a regeneration control block 31 (described later herein) of the controller 9 to start compulsory regeneration control. The regeneration instruction device 23 in the present embodiment is connected to the controller 9 via a controller area network (CAN) 10. Examples of the regeneration instruction device 23 include a manual regeneration switch disposed in an operator cab of the working machine. Upon the regeneration instruction device 23 being operated by the operator, that is, upon the manual regeneration switch being turned on, a compulsory regeneration starting signal is output and then sent as an input to a regeneration instruction input block 32 (described later herein) within the controller 9.

Figure 2:
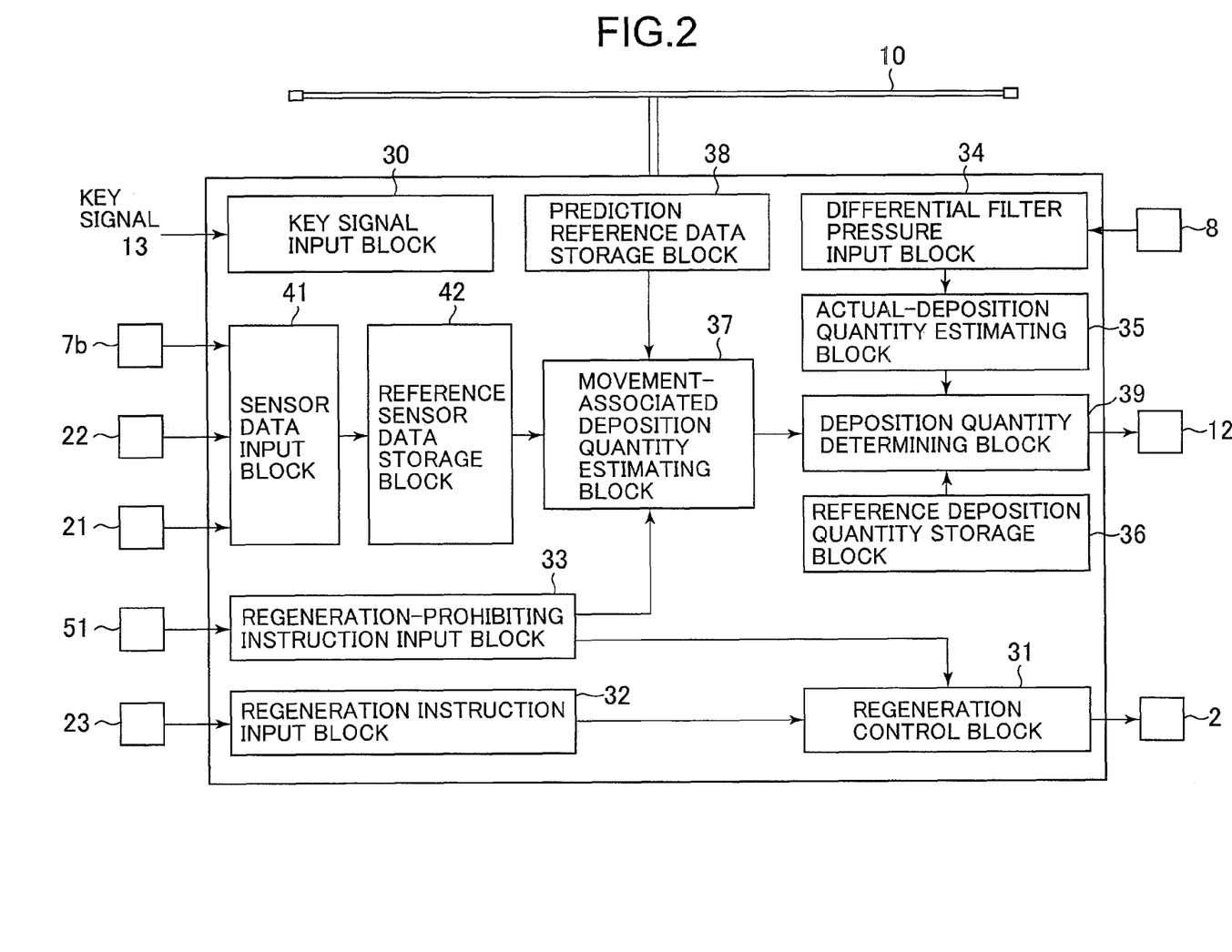
FIG. 2 is a block diagram of a controller in the working machine according to the first embodiment of the present invention.

The controller 9 is described in detail below. FIG. 2 is a block diagram of the controller 9 in the present embodiment. In FIG. 2, the same elements as those shown in FIG. 1 are each assigned the same reference number or symbol, and description of these elements is omitted (the same also applies to the figures that follow in the remainder hereof).

In addition to the regeneration control block (regeneration control means) 31 and the regeneration instruction input block 32, the controller 9 in FIG. 2 includes a key signal input block 30, a regeneration-prohibiting instruction input block 33, a differential filter pressure input block 34, and an actual-deposition quantity estimating block (actual-deposition quantity estimating means) 35. The controller 9 further includes a reference deposition quantity storage block (first storage means) 36, a movement-associated deposition quantity estimating block (movement-associated deposition quantity estimating means) 37, a prediction reference data storage block (second storage means) 38, and a deposition quantity determining block (deposition quantity determining means) 39.

A key signal 13 is input from a key cylinder (not shown) into which an engine key will be inserted, to the key signal input block 30. The controller 9 starts operating, upon receiving a key ON signal as the key signal 13 from the key cylinder via the key signal input block 30. Upon receiving a key OFF signal as the key signal, the controller 9 stops operating.

The regeneration control block (regeneration control means) 31 controls the compulsory regeneration of the filter 6. The regeneration control block 31 in the present embodiment transmits control signals to the fuel injector 2, and controls the compulsory regeneration by allowing a certain quantity of fuel to stay in the exhaust gases during either multi-injection or post-injection that retards injection timing of the fuel behind its normal timing. Thus leaving a certain quantity of fuel in the exhaust causes the unburnt fuel within the exhaust to react with the oxidation catalyst 5, and compulsorily elevates the exhaust temperature at the inlet of the filter 6 to the regenerative temperature, thereby to compulsorily regenerate the filter 6. The regeneration control block 31 starts compulsory regeneration control based on the compulsory regeneration starting signal input from the regeneration instruction device 23 via the regeneration instruction input block 32. Briefly, the regeneration control block 31 in the present embodiment controls manual regeneration.

The differential filter pressure input block 34 receives the differential pressure value detected between the inlet and outlet of the filter 6 by the differential pressure sensor 8, from the sensor, and outputs the received differential pressure value to the actual-deposition quantity estimating block 35.

The actual-deposition quantity estimating block (actual-deposition quantity estimating means) 35 estimates an actual deposition quantity A [g/L], the actual quantity of PM deposited in the filter 6. The actual-deposition quantity estimating block 35 in the present embodiment estimates the actual PM deposition quantity A based on the differential pressure value output from the differential filter pressure input block 34. In the present embodiment, the actual PM deposition quantity A is estimated from the differential pressure across the filter 6. Alternatively, however, the actual PM deposition quantity A may be estimated from a cumulative operation time of the engine 1 from completion time of immediately previous regeneration.

The reference deposition quantity storage block (first storage means) 36 is where a reference deposition quantity B

[g/L] that indicates regeneration timing of the filter 6 in terms of the quantity of PM deposited therein is stored to avoid damage (melting damage, thermal damage, and the like) to the filter 6. Under an environment without potentially flammable substances around the working machine, the reference deposition quantity B is equivalent to (1) the amount of PM deposition that indicates timing in which to start automatic regeneration, or (2) the amount of PM deposition that indicates timing in which to prompt the operator via a display device (or the like) to manually regenerate the filter. The reference deposition quantity B may be stored into the storage block 36 during manufacturing or shipping of the working machine, or may be rendered storable into the storage block 36 via a numeric keypad or any other input device disposed in the working machine. The reference deposition quantity storage block 36 is preferably a non-volatile memory capable of retaining data even if electric power is not supplied to the memory.

The movement-associated deposition quantity estimating block (movement-associated deposition quantity estimating means) 37 estimates a movement-associated PM deposition quantity C [g/L], the quantity of PM likely to be deposited in the filter 6 during movement of the working machine to a place having no potentially flammable substances around, the place being where the compulsory regeneration of the filter 6 is possible (hereinafter, this place is referred to as the place of regeneration). More specifically, the movement-associated deposition quantity estimating block 37 estimates the movement-associated PM deposition quantity C from a predicted value of either a time required for the movement of the working machine to the place of regeneration, or a relative distance to the place of regeneration (hereinafter, the predicted time requirement and relative distance may be referred to as prediction reference data). The prediction reference data used for the estimation of the movement-associated PM deposition quantity C in the present embodiment is stored within the prediction reference data storage block 38. A sensor data input block 41 and a reference sensor data storage block 42, both shown near the movement-associated deposition quantity estimating block 37 in FIG. 2, will be set forth in a second embodiment (described later herein).

The prediction reference data storage block (second storage means) 38 is where is stored either the predicted time requirement [min] for moving the working machine to the place of regeneration, or the predicted distance [m] to the place of regeneration. For example, the prediction reference data stored in the storage block 38 contains: (a) a maximum predicted time requirement for movement from any position in a working area to the place of regeneration, or a maximum predicted distance from the particular position to the place of regeneration; (b) a predicted time requirement for movement from a position identified by a position-measuring device 14 (see FIG. 1) that uses GPS (Global Positioning System) or the like, the device 14 being installed in the working machine, to the place of regeneration, or a predicted distance from the identified position to the place of regeneration; (c) a measured time requirement for movement from a major working position to the place of regeneration, or a measured distance from the major working position to the place of regeneration; (d) a time requirement or relative distance predicted in appropriate timing by a person such as the operator or a system administrator; or (e) appropriate corrections made to either of items (a) to (d) described above. The prediction reference data is preferably assigned with an allowance great enough to enable the movement to the place of regeneration. The prediction reference data stored in the storage block 38 will be output to the movement-associated deposition quantity estimating block 37.

For ex-post facto storage, the prediction reference data may be stored into the storage block 38 via, for example, a numeric keypad or any other input device disposed in the working machine. An alternative method may be by connecting a wireless communications device 11 (see FIG. 1) to the working machine and transmitting the prediction reference data simultaneously from a management terminal 16 (see FIG. 1) placed at the administrator's side, to the same wireless communications devices 11 of other (external) working machines. In addition, the prediction reference data storage block 38 is preferably a non-volatile memory capable of retaining data even if electric power is not supplied to the memory. Furthermore, although the reference deposition quantity storage block (first storage means) 36 and the prediction reference data storage block (second storage means) 38 have been described as storage blocks independent of each other in the present embodiment, it goes without saying that the reference deposition quantity and the prediction reference data may be stored into one storage block.

Figure 3:
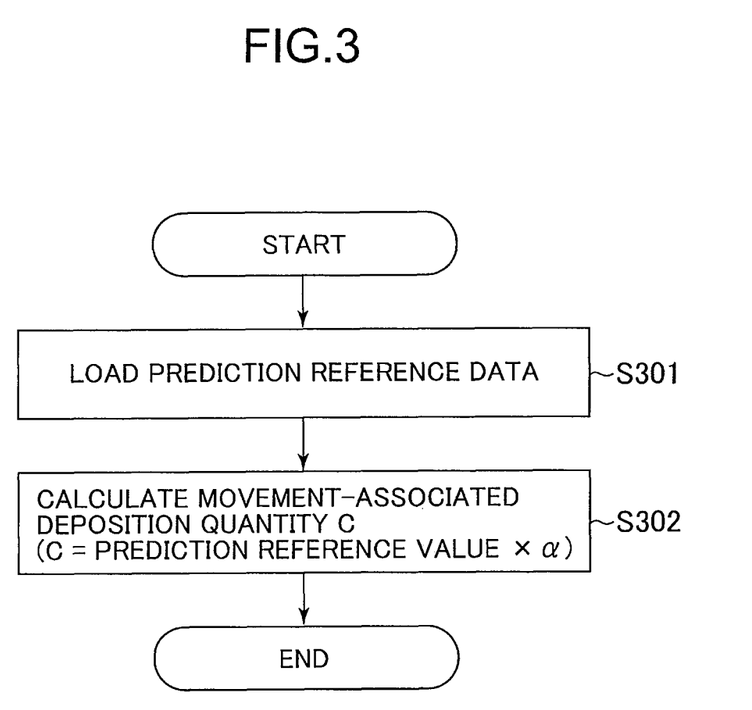
FIG. 3 is a flow diagram of calculation of a movement-associated deposition quantity C by a movement-associated deposition quantity estimating block in the first embodiment of the present invention.

FIG. 3 is a flow diagram of calculation of the movement-associated deposition quantity C by the movement-associated deposition quantity estimating block 37 in the first embodiment of the present invention. As shown in the figure, the movement-associated deposition quantity estimating block 37 first loads stored prediction reference data from the prediction reference data storage block 38 (step S301). Next, the movement-associated deposition quantity estimating block 37 calculates the movement-associated deposition quantity C by multiplying the loaded prediction reference data by predetermined constant α (step S302). For the calculation of the movement-associated deposition quantity C based on the predicted time requirement, the constant α used in step S302 is equivalent to a deposition quantity per unit time, [g/L·min], or for the calculation of the deposition quantity C based on the predicted distance, the constant α is equivalent to a deposition quantity per unit distance, [g/L·m]. The thus-calculated movement-associated deposition quantity C is output to the deposition quantity determining block 39.

Referring back to FIG. 2, the deposition quantity determining block 39 determines whether the actual deposition quantity A estimated by the actual-deposition quantity estimating block 35 has reached a deposition alarm level (D[g/L]) that is a value derived by subtracting the estimated movement-associated deposition quantity C estimated by the movement-associated deposition quantity estimating block 37 from the reference deposition quantity B stored within the reference deposition quantity storage block 36. That is to say, the deposition quantity determining block 39 determines whether the "Actual deposition quantity A≧Deposition alarm level D (=Reference deposition quantity B−Movement-associated deposition quantity C)" holds.

Figure 4:
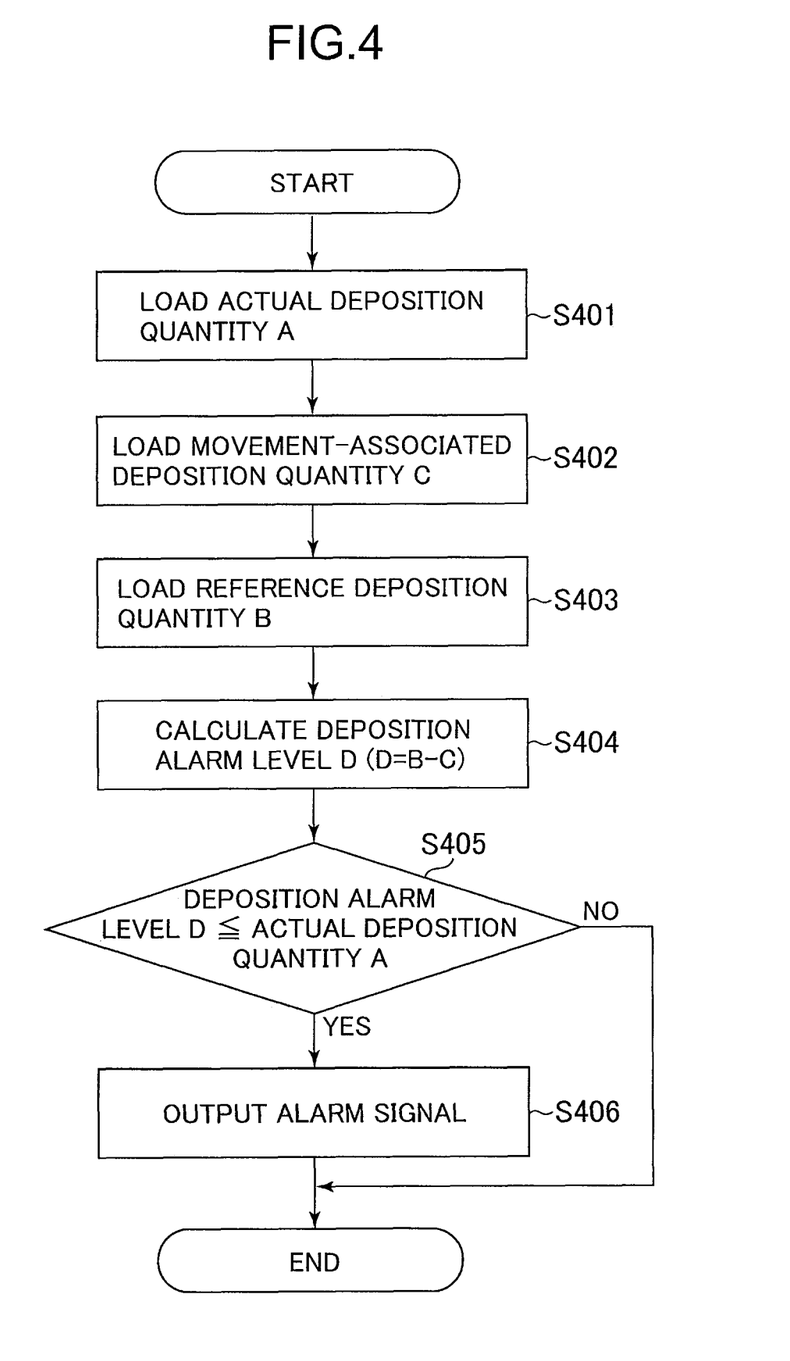
FIG. 4 is a flow diagram of determination of an actual deposition quantity A by a deposition quantity determining block in the first embodiment of the present invention.

FIG. 4 is a flow diagram of the determination of the actual deposition quantity A by the deposition quantity determining block 39 in the present embodiment. As shown in the figure, the deposition quantity determining block 39 first loads the calculated actual deposition quantity A from the actual-deposition quantity estimating block 35 (step S401), and after loading the calculated movement-associated deposition quantity C from the movement-associated deposition quantity estimating block 37 (step S402), loads the stored reference deposition quantity B from the reference deposition quantity storage block 36 (step S403). Next, the deposition quantity determining block 39 calculates the deposition alarm level D by subtracting the movement-associated deposition quantity C from the reference deposition quantity B (step S404). After this, the deposition quantity determining block 39 determines whether the actual deposition quantity A has reached the deposition alarm level D (step S405). Upon determining that the actual deposition quantity A is equal to or greater than the deposition alarm level D, the deposition quantity determining block 39 outputs an alarm signal to notify to the alarm device 12 that the time has come for the operator to move the working machine to the place of regeneration (step S406). Conversely if the actual deposition quantity A is less than the deposition alarm level D, the deposition quantity determining block 39 terminates the process without transmitting the alarm signal.

If it is determined by the deposition quantity determining block 39 that the actual deposition quantity A has reached the deposition alarm level D, the alarm device 12 in FIG. 1 delivers the alarm signal to notify the arrival of the time for the operator to move the working machine to the place of regeneration. The alarm device 12 is connected to the controller 9 via the CAN 10. More specific examples of the alarm device 12 include: a display device that displays a warning message (e.g., "Move the machine to the place of regeneration and start the manual regeneration"), an icon, or other graphics, to prompt the operator to move the working machine to the place of regeneration; an audio generator that gives off a warning sound to prompt the movement; and a lighting device that activates a warning lamp. For example, the display device may be of a normal vehicle-mounted type adapted to display a radiator coolant temperature indicator, a fuel meter, an operation hour-meter of the vehicle body, and/or other instruments. Upon receiving the alarm signal from the deposition quantity determining block 39, the alarm device 12 generates the above warning message or the like to notify to the operator that the time has come to move the working machine to the place of regeneration.

As is clear from the above description, the working machine according to the present embodiment includes the regeneration instruction device 23 that instructs the regeneration control block 31 to start the compulsory regeneration. The working machine also includes the actual-deposition quantity estimating block 35 that estimates the actual deposition quantity A, the reference deposition quantity storage block 36 that has the reference deposition quantity B stored therein, the movement-associated deposition quantity estimating block 37 that estimates the movement-associated deposition quantity C based on prediction reference data, the deposition quantity determining block 39 that determines whether the actual deposition quantity A has reached the deposition alarm level D, and the alarm device 12 that if the actual deposition quantity A is judged to have reached the deposition alarm level D, notifies to the operator that the time has come to start the movement of the working machine to the place of regeneration.

The thus-configured working machine notifies the operator of the movement timing that allows for the quantity of PM deposited while the working machine is being moved to the place of regeneration, and thus prevents the quantity of PM deposition in the filter 6 from exceeding a permissible level before the machine is moved to the place of regeneration. The present embodiment, therefore, prevents excessive deposition of PM and hence avoids damaging the filter, even under a situation that requires, prior to the manual regeneration of the filter 6, moving the machine to the place of regeneration.

The above description has been given assuming that the regeneration control block 31 conducts the manual regeneration only. In addition to the manual regeneration, however, the control block 31 may be configured to conduct automatic regeneration so that for example, if the quantity of PM deposition estimated by the actual-deposition quantity estimating block 35 exceeds a predetermined threshold level or when any other predefined condition is satisfied, the compulsory regeneration will be conducted automatically. In that case, to ensure safety by preventing automatic regeneration from being started in presence of potentially flammable substances near the working machine, the controller 9 preferably includes a regeneration-prohibiting instruction device 51 (see FIG. 2) that instructs the regeneration control block 31 to prohibit automatic regeneration. The regeneration-prohibiting instruction device 51 may, as shown in FIG. 2, be connected to the controller 9 via the CAN 10. A more specific example of the regeneration-prohibiting instruction device 51 is a regeneration-prohibiting switch disposed in the operator cab of the working machine. Upon the regeneration-prohibiting instruction device 51 being operated by the operator, that is, upon the regeneration-prohibiting switch being turned on, the regeneration-prohibiting instruction device 51 outputs a regeneration-prohibiting signal, which is then input to the regeneration control block 31 via the regeneration-prohibiting instruction input block 33. While the input regeneration-prohibiting signal from the regeneration-prohibiting instruction device 51 is active, the regeneration control block 31 suspends the execution of automatic regeneration, thus preventing automatic regeneration from being executed, even in the presence of potentially flammable substances around the working machine.

Additionally, if the regeneration-prohibiting instruction device 51 is configured to conduct the above, the movement-associated deposition quantity estimating block 37 is preferably configured to estimate the movement-associated deposition quantity C only when the prohibition of automatic regeneration is instructed by the instruction device 51. The regeneration-prohibiting instruction input block 33 in this case will, as shown in FIG. 2, output the regeneration-prohibiting signal to the movement-associated deposition quantity estimating block 37 and the regeneration control block 31. Calculation of a movement-associated deposition quantity C' by the movement-associated deposition quantity estimating block 37 in such a case will be described later herein with reference to a flow diagram.

Figure 5:
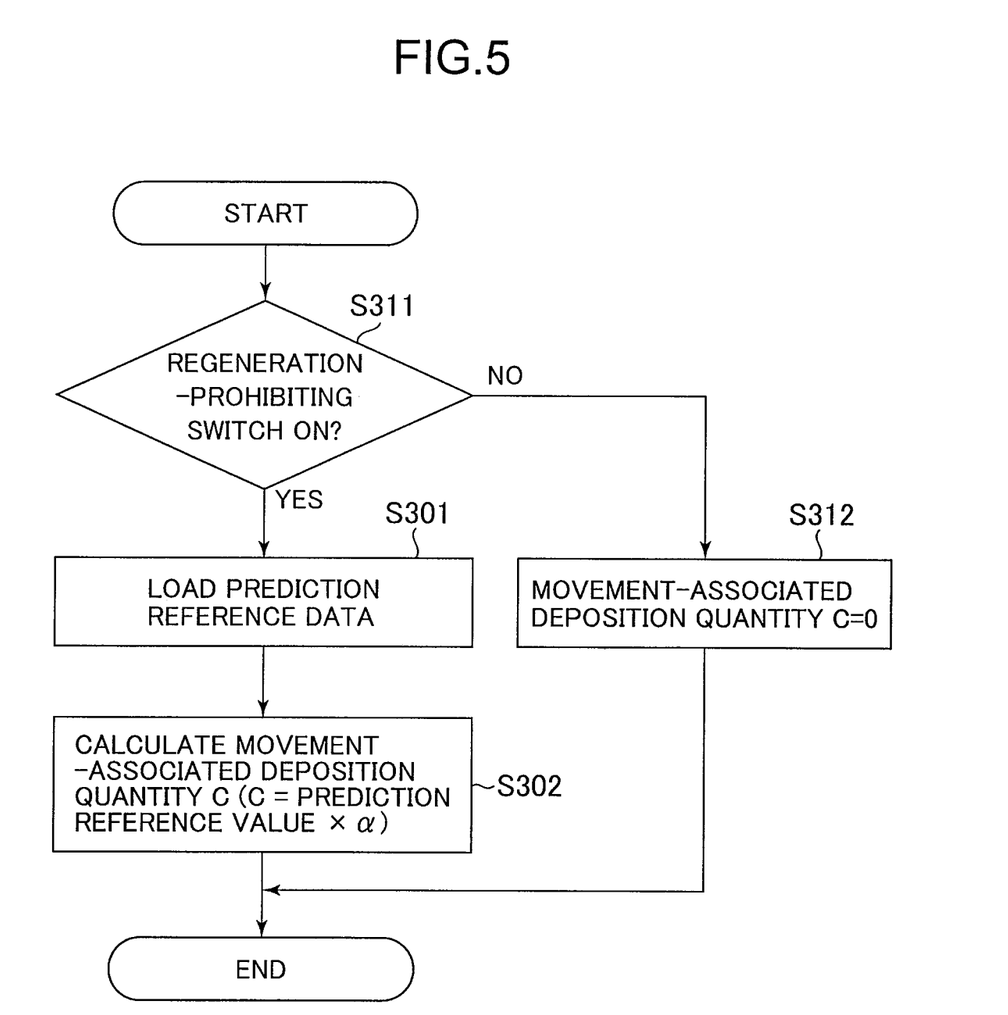
FIG. 5 is another flow diagram of the calculation of the movement-associated deposition quantity C by the movement-associated deposition quantity estimating block in the first embodiment of the present invention.

FIG. 5 is another flow diagram of the calculation of the movement-associated deposition quantity C by the movement-associated deposition quantity estimating block 37 in the present embodiment. The description below assumes that the regeneration-prohibiting switch is installed as the regeneration-prohibiting instruction device 51.

As shown in FIG. 5, the movement-associated deposition quantity estimating block 37 first determines whether the regeneration-prohibiting switch is in an ON state (step S311). More specifically, the movement-associated deposition quantity estimating block 37 discriminates a state of the regeneration-prohibiting switch by determining whether the regeneration-prohibiting signal is input via the regeneration-prohibiting instruction input block 33. If, in step S311, the regeneration-prohibiting switch is determined to be in an OFF state and potentially flammable substances are thereby judged to be absent around the working machine, the movement-associated deposition quantity estimating block 37 determines the movement-associated deposition quantity C to be zero (step S312) and terminates the process. Conversely if the regeneration-prohibiting switch is determined to be ON in step S311, the movement-associated deposition quantity estimating block 37 calculates the movement-associated deposition quantity C using the same expression as that shown by way of example in FIG. 3 (steps S301, 302), and completes the process.

If the movement-associated deposition quantity C is thus determined to be zero under the OFF state of the regeneration-prohibiting switch, the deposition quantity determining block 39 can determine the actual deposition quantity A with the reference deposition quantity B taken as the deposition alarm level D. In other words, the deposition quantity determining block 39 can be used to notify to the operator that the timing in which the actual deposition quantity A has reached the reference deposition quantity B is the starting time of regeneration. This allows the working machine to be operated appropriately, depending upon whether potentially flammable substances are present around the machine, and versatility of the machine to be improved. If the alarm device 12 is a display device, the display device preferably displays a warning message (e.g., "The filter requires manual regeneration. Press the manual regeneration button."). This message prompts the manual regeneration of the filter, instead of the earlier-described warning message prompting the movement of the working machine.

Next, a second embodiment of the present invention is described below. The present embodiment has a feature in that the movement-associated deposition quantity estimating block 37 corrects the movement-associated deposition quantity C in accordance with either the outside air temperature, the exhaust temperature, or the engine speed. In the present embodiment, as shown in FIG. 2, the reference sensor data storage block 42 connected to the sensor data input block 41 is further connected to the movement-associated deposition quantity estimating block 37. Except for this feature, the present embodiment is substantially the same as the first embodiment.

The sensor data input block 41 is connected to an exhaust temperature sensor (means for detecting an outside air temperature) 7b that detects the exhaust temperature at the inlet of the filter (means for detecting an exhaust temperature) 6, an outside-air temperature sensor 22 that detects the outside air temperature, and an engine speed sensor (means for detecting a rotational speed of the engine) 21 that detects the engine speed of the engine 1. The sensor data input block 41 receives an exhaust temperature signal, an outside-air temperature signal, and an engine speed signal, from the sensors 7b, 22, 21 (hereinafter, the three sensor signals may be referred to as sensor output values), and outputs the signals to the reference sensor data storage block 42.

The reference sensor data storage block 42 calculates the reference sensor data used for selecting a correction coefficient $\beta$ in step S322 described later herein, and acquires the calculated reference sensor data. The reference sensor data storage block 42 in the present embodiment calculates the reference sensor data based on each of the sensor output values received from the sensor data input block 41. One method of calculating the reference sensor data is by, for example, averaging each sensor output value that was obtained in the past from alarm timing of the alarm device 12 to the time of day when the manual regeneration instruction device 23 was last operated (i.e., the time required for the movement of the working machine to the place of regeneration). Another method of calculation is by, for example, averaging each sensor output value existing during operation of the working machine. Reference sensor data that has thus been calculated is stored into the reference sensor data storage block 42 and then output to the movement-associated deposition quantity estimating block 37 appropriately according to particular needs. It should be noted that the correction coefficient $\beta$ mentioned above is used for the movement-associated deposition quantity estimating block 37 to correct the movement-associated deposition quantity C.

Figure 6:
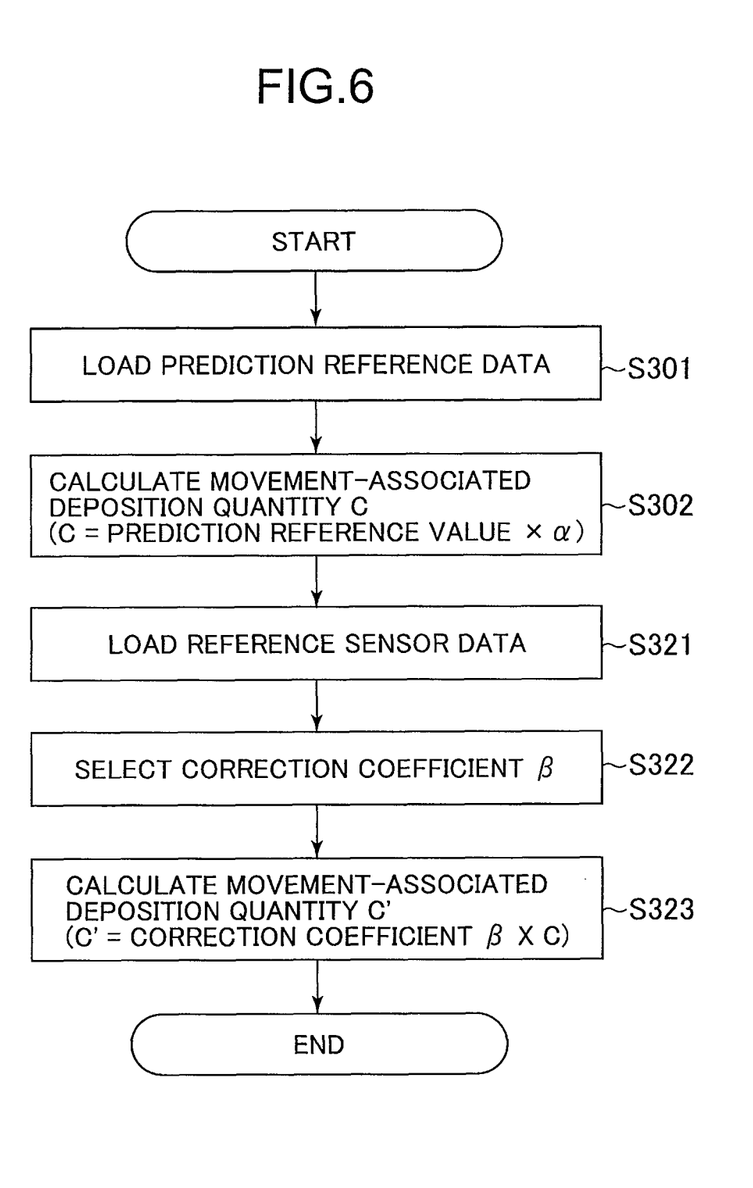
FIG. 6 is a flow diagram of calculation of a movement-associated deposition quantity C' by a movement-associated deposition quantity estimating block in a second embodiment of the present invention.

A process flow of calculation of the movement-associated deposition quantity C' in the present embodiment is described below. FIG. 6 is a flow diagram of the calculation of the movement-associated deposition quantity C' by the movement-associated deposition quantity estimating block 37 in the second embodiment of the present invention. As shown in the figure, the movement-associated deposition quantity estimating block 37 in the present embodiment, as with that of the first embodiment, first loads prediction reference data (step S301) and then calculates the movement-associated deposition quantity C' (step S302). The movement-associated deposition quantity estimating block 37 loads one of the three stored reference sensor values (reference outside air temperature, reference exhaust temperature, and reference engine speed) from the reference sensor data storage block 42 (step S321), and selects the correction coefficient $\beta$ based on the loaded reference sensor value (step S322). Correction coefficient tables preset for each reference sensor value are used when the correction coefficient $\beta$ is selected in step S322.

Figure 7:
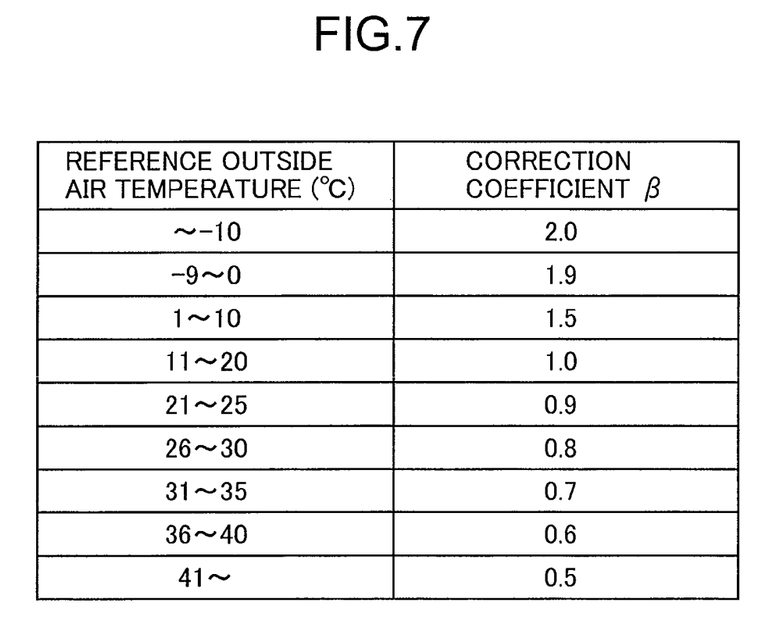
FIG. 7 is a correction coefficient table using an outside air temperature as a reference sensor value in the second embodiment of the present invention.
Figure 8:
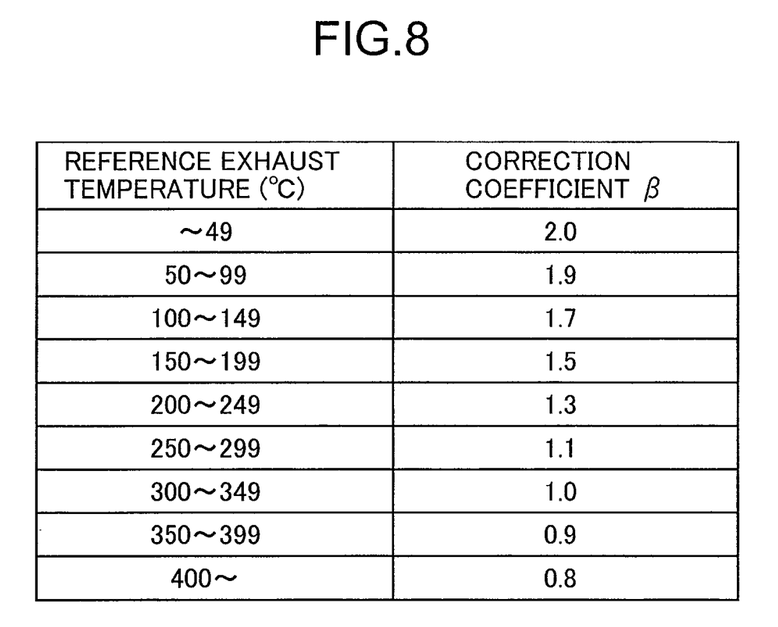
FIG. 8 is a correction coefficient table using an exhaust temperature as a reference sensor value in the second embodiment of the present invention.
Figure 9:
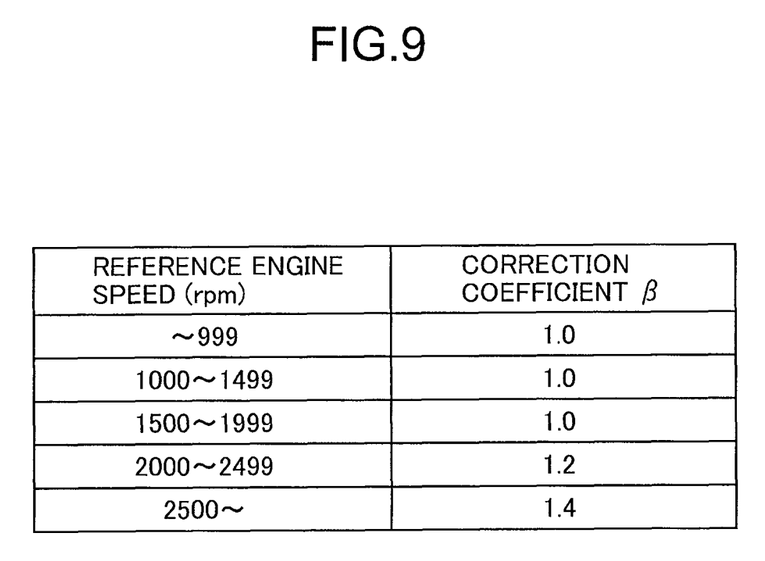
FIG. 9 is a correction coefficient table using an engine speed as a reference sensor value in the second embodiment of the present invention.

FIG. 7 is a correction coefficient table that uses the outside air temperature as a reference sensor value in the present embodiment. FIG. 8 is a correction coefficient table that uses the exhaust temperature as a reference sensor value. FIG. 9 is a correction coefficient table that uses the engine speed as a reference sensor value. These tables assume that decimal digits in each reference sensor value are truncated.

In the outside-air temperature table of FIG. 7, the correction coefficient $\beta$ is set to decrease as the outside air temperature increases, and to increase particularly at outside air temperatures below 10° C. This allows for the fact that at high outside air temperatures, PM tends not to easily become deposited in the filter 6. Additionally, in the exhaust temperature table of FIG. 8, the correction coefficient $\beta$ is set to decrease as the exhaust temperature increases. This allows for the fact that at high exhaust temperatures, since the exhaust temperature can be easily elevated to a regenerative temperature, PM tends not to easily become deposited in the filter 6. Furthermore, in the engine speed table of FIG. 9, the correction coefficient $\beta$ is set to increase above 1.0, at engine speeds in excess of 2,000 rpm (threshold value). This allows for the fact that an increase in engine speed results in a greater tendency for PM to become deposited in the filter 6.

For example, if the reference outside air temperature is loaded as a reference sensor value in step S321 of FIG. 6, the movement-associated deposition quantity estimating block 37 selects the correction coefficient $\beta$ corresponding to the loaded reference sensor value in step S322, from the correction coefficient table shown in FIG. 7. More specifically, if the reference outside air temperature is 22° C., 0.9 is selected as the correction coefficient $\beta$ in step S322. After thus selecting the correction coefficient $\beta$ in step S322, the estimating block 37 calculates the movement-associated deposition quantity C' (step S323) by multiplying, by the correction coefficient $\beta$, the movement-associated deposition quantity C that was calculated in step S302, and completes the process. The movement-associated deposition quantity C' that was calculated in step 323 above by the movement-associated deposition quantity estimating block 37 is used for the deposition quantity determining block 39 to calculate the deposition alarm level D, as in the example shown in FIG. 4.

According to the present embodiment having the above-described configuration, since the movement-associated deposition quantity C based on either the outside air temperature, the exhaust temperature, or the engine speed, is corrected, an alarm signal or message is output to prompt the operator to move the working machine to the place of regeneration in the appropriate timing according to the quantity of PM deposited.

Although an example of correcting the movement-associated deposition quantity C in accordance with either the outside air temperature, the exhaust temperature, or the engine speed, has been set forth in the above description, the movement-associated deposition quantity may be corrected in accordance with at least two of the three factors.

What is claimed is:

1. A working machine comprising:
   a diesel engine having a fuel injector;
   an exhaust treatment device having a filter to trap particulate matter (PM) contained in exhaust gases of the engine;
   an electronic controller that outputs a regeneration control signal that compulsorily elevates an exhaust temperature by allowing a certain quantity of fuel to stay in the exhaust gases of the engine to compulsorily regenerate the filter;
   a regeneration instruction switch device that provides a signal instructing the electronic controller to perform the regeneration control to start the compulsory regeneration;
   said electronic controller further providing instructions for estimating an actual quantity of PM deposition in the filter;
   a non-volatile memory which stores a reference quantity of deposition that indicates regeneration timing of the filter in terms of the quantity of PM deposited in the filter;
   said electronic controller further providing instructions which, when implemented,
      estimate a movement-associated quantity of PM likely to be deposited during movement of the working machine to a place which is suitable for the compulsory regeneration of the filter, on the basis of a predicted value of either a time required for movement of the working machine to the place of regeneration or a distance to the place of regeneration,
      determine whether the actual quantity of PM deposition that has been estimated has reached a deposition alarm level derived by subtracting the movement-associated PM deposition quantity from the reference quantity of deposition, and
      output an alarm signal when the actual quantity of PM deposition has reached the deposition alarm level; and
   an alarm device that when the alarm signal output by the electronic controller is received, notifies an operator of a time to start the movement of the working machine to the place of regeneration.

2. The working machine according to claim 1, further comprising:
   a regeneration-prohibiting instruction switch device which instructs the electronic controller to prohibit the compulsory regeneration;
   wherein the electronic controller further provides instructions which, when implemented, estimate the movement-associated deposition quantity, only when the prohibition of the compulsory regeneration is instructed by the regeneration-prohibiting instruction device.

3. The working machine according to claim 1, wherein:
   the non-volatile memory further stores the predicted value of either the time required for the movement of the working machine to the place of regeneration, or the distance thereto; and
   the electronic controller further provides instructions which, when implemented, estimate the movement-associated deposition quantity from the predicted time requirement or distance stored within the storage.

4. The working machine according to claim 3, further comprising:
   an outside-air temperature sensor which detects an outside air temperature;
   wherein the electronic controller further provides instructions which, when implemented, correct the movement-associated deposition quantity in accordance with the outside air temperature detected by the outside air temperature detection sensor.

5. The working machine according to claim 3, further comprising:
   a temperature sensor which detects an exhaust temperature at an inlet of the filter;
   wherein the electronic controller further provides instructions which, when implemented, correct the movement-associated deposition quantity in accordance with the exhaust temperature detected by the exhaust temperature detection sensor.

6. The working machine according to claim 3, further comprising:
   an engine speed sensor which detects a rotational speed of the engine;
   wherein the electronic controller further provides instructions which, when implemented, correct the movement-associated deposition quantity in accordance with the engine speed detected by the engine speed detection sensor.

7. The working machine according to claim 2, wherein:
   the non-volatile memory further stores the predicted value of either the time required for the movement of the working machine to the place of regeneration, or the distance thereto; and
   the electronic controller further provides instructions which, when implemented, estimate the movement-associated deposition quantity from the predicted time requirement or distance stored within the storage.

* * * * *